(12) United States Patent
Kim et al.

(10) Patent No.: US 8,218,951 B2
(45) Date of Patent: Jul. 10, 2012

(54) STORAGE MEDIUM STORING PROGRAM MANAGEMENT INFORMATION, AND REPRODUCING METHOD AND APPARATUS

(75) Inventors: Kwang-min Kim, Anyang-si (KR); Seong-jin Moon, Suwon-si (KR); Jung-ho Lee, Yongin-si (KR); Kil-soo Jung, Hwaseong-si (KR); Sung-wook Park, Seoul (KR); Man-seok Kang, Suwon-si (KR); Hyun-kwon Chung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1679 days.

(21) Appl. No.: 10/974,030

(22) Filed: Oct. 27, 2004

(65) Prior Publication Data
US 2005/0117883 A1 Jun. 2, 2005

(30) Foreign Application Priority Data

Oct. 30, 2003 (KR) .................. 10-2003-0076218
Feb. 9, 2004 (KR) .................. 10-2004-0008466
Jun. 18, 2004 (KR) .................. 10-2004-0045406

(51) Int. Cl.
*H04N 5/89* (2006.01)
*H04N 5/92* (2006.01)

(52) U.S. Cl. ............................ 386/336; 386/326

(58) Field of Classification Search .......... 386/1, 45–46, 386/125–126, 326–337, 341, 248
See application file for complete search history.

(56) References Cited

U.S. PATENT DOCUMENTS

| | | | |
|---|---|---|---|
| 6,366,732 B1 | 4/2002 | Murase et al. | |
| 6,580,870 B1 * | 6/2003 | Kanazawa et al. | 386/95 |
| 2003/0074247 A1 * | 4/2003 | Dick et al. | 705/9 |
| 2004/0018007 A1 | 1/2004 | Akita | |
| 2004/0025012 A1 | 2/2004 | Burks | |

FOREIGN PATENT DOCUMENTS

| | | |
|---|---|---|
| EP | 1 357 749 A1 | 10/2003 |
| EP | 1 672 637 A1 | 6/2006 |
| JP | 2002-218394 | 8/2002 |
| JP | 2002-245754 | 8/2002 |
| KR | 2002-86991 | 11/2002 |
| WO | WO 01/04743 A2 | 1/2001 |

(Continued)

OTHER PUBLICATIONS

Japanese Office Action issued on Jul. 27, 2010, in corresponding Japanese Patent Application No. 2006-537878 (4 pages).

(Continued)

*Primary Examiner* — Thai Tran
*Assistant Examiner* — Nigar Chowdhury
(74) *Attorney, Agent, or Firm* — NSIP Law

(57) ABSTRACT

A storage medium storing program applications to provide additional functions using moving-images and management information needed to manage the program applications. The storage medium includes reproduction mode data reproducing moving-image data, program data including a plurality of program applications providing additional functions using the moving-image data, system data controlling the execution of the reproduction mode data and the program data, and management information managing the execution of the program applications in unit of title. The program applications providing additional functions can be managed in unit of title and loaded to a system memory in advance to be executed.

4 Claims, 11 Drawing Sheets

FOREIGN PATENT DOCUMENTS

| | | | |
|---|---|---|---|
| WO | WO 01/33847 | A1 | 5/2001 |
| WO | WO 02/087231 | A2 | 10/2002 |

OTHER PUBLICATIONS

European Search Report issued on Jul. 4, 2011, in counterpart European Patent Application No. 04793594.5 (5 pages, in English).

Newell, J. C., "An Introduction to MHP 1.0 and MHP 1.1," BBC R&D White Paper, May 2002, pp. 1-20, vol. # WHP 030.

Examination Report issued on Apr. 18, 2012 in counterpart European Patent Application No. 04793594.5. (4 pages, in English).

\* cited by examiner

| TITLE | JAVA APPLICATION | MANAGEMENT INFORMATION |
|---|---|---|
| MENU | JAVA application #1 | WHETHER TO BE FIRST EXECUTED, APPLICATION POSITION (URI), START AND TERMINATION TIMES, START AND TERMINATION METHODS, AMOUNT OF MEMORY ALLOTTED, TITLE-BOUND (OR UNBOUND) INFORMATION |
| | JAVA application #3 | WHETHER TO BE FIRST EXECUTED, APPLICATION POSITION (URI), START AND TERMINATION TIMES, START AND TERMINATION METHODS, AMOUNT OF MEMORY ALLOTTED, TITLE-BOUND (OR UNBOUND) INFORMATION |
| TITLE #1 | JAVA application #4 | WHETHER TO BE FIRST EXECUTED, APPLICATION POSITION (URI), START AND TERMINATION TIMES, START AND TERMINATION METHODS, AMOUNT OF MEMORY ALLOTTED, TITLE-BOUND (OR UNBOUND) INFORMATION |
| | ..... | ..... |
| | JAVA application #6 | WHETHER TO BE FIRST EXECUTED, APPLICATION POSITION (URI), START AND TERMINATION TIMES, START AND TERMINATION METHODS, AMOUNT OF MEMORY ALLOTTED, TITLE-BOUND (OR UNBOUND) INFORMATION |
| TITLE #2 | JAVA application #7 | WHETHER TO BE FIRST EXECUTED, APPLICATION POSITION (URI), START AND TERMINATION TIMES, START AND TERMINATION METHODS, AMOUNT OF MEMORY ALLOTTED, TITLE-BOUND (OR UNBOUND) INFORMATION |
| ..... | ..... | ..... |
| TITLE UNBOUND | JAVA application #9 | TITLE INFORMATION, APPLICATION POSITION (URI), START AND TERMINATION TIMES, START AND TERMINATION METHODS, AMOUNT OF MEMORY ALLOTED |
| | ..... | ..... |

702 — MENU row
704 — TITLE #1 row
706 — TITLE #2 row
708 — TITLE UNBOUND row

TITLE INFORMATION (710)  APPLICATION INFORMATION (720)  OPERATION AND STATE INFORMATION (730)

FIG. 10

| | TABLE VERSION INFORMATION AND ADDITIONAL INFORMATION — 140 | | | |
|---|---|---|---|---|
| TITLE #1 TITLE NAME | APP.#3 JAVA PROGRAM NAME | APPLICATION STORAGE POSITION/NAME/TITLE INFORMATION/ENTRY POINT INFORMATION | APPLICATION VERSION INFORMATION/TITLE-BOUND EXECUTION LIMITATION INFORMATION /APPLICATION EXECUTION LIMITATION INFORMATION | APPLICATION EXECUTION METHOD/START TIME/ TERMINATION METHOD/ TERMINATION TIME/ INFORMATION REGARDING REQUIRED MEMORY/ EXECUTION START PARAMETER INFORMATION |
| | APP.#4 | ... | ... | ... |
| | APP.#6 | ... | ... | ... |
| TITLE #2 | APP.#7 | ... | ... | ... |
| ... | ... | ... | ... | ... |
| TITLE INFORMATION (1010) | BASIC APPLICATION INFORMATION (1020) | | APPLICATION ATTRIBUTE INFORMATION (1030) | APPLICATION OPERATION INFORMATION (1040) |

FIG. 11

| TITLE INFORMATION AND ADDITIONAL INFORMATION 1102 | | | | |
|---|---|---|---|---|
| | | APPLICATION STORAGE POSITION/NAME/TITLE INFORMATION/ENTRY POINT INFORMATION | APPLICATION VERSION INFORMATION/TITLE-BOUND EXECUTION LIMITATION INFORMATION /APPLICATION EXECUTION LIMITATION INFORMATION | APPLICATION EXECUTION METHOD/START TIME/ TERMINATION METHOD/ TERMINATION TIME/ INFORMATION REGARDING REQUIRED MEMORY/ EXECUTION START PARAMETER INFORMATION/ PRELOAD INFORMATION/ PRE-PATCH INFORMATION/ PAUSE TIME INFORMATION |
| TITLE #1 TITLE NAME | APP.#3 JAVA PROGRAM NAME | | | |
| | APP.#4 | | | |
| | ... | ... | ... | ... |
| TITLE #2 | APP.#6 | | | |
| | APP.#7 | | | |
| | ... | ... | ... | ... |
| ... | | | | |
| TITLE INFORMATION (1110) | BASIC APPLICATION INFORMATION (1120) | APPLICATION ATTRIBUTE INFORMATION (1130) | APPLICATION OPERATION INFORMATION (1140) | |

STORAGE MEDIUM STORING PROGRAM MANAGEMENT INFORMATION, AND REPRODUCING METHOD AND APPARATUS

CROSS-REFERENCE TO RELATED APPLICATIONS

This application claims the priority of Korean Patent Application No. 2003-76218, filed on Oct. 30, 2003 in the Korean Intellectual Property Office, Korean Patent Application No. 2004-8466, filed on Feb. 9, 2004 in the Korean Intellectual Property Office, and Korean Patent Application No. 2004-45406, filed on Jun. 18, 2004 in the Korean Intellectual Property Office, the disclosures of which are incorporated herein in its entirety by reference.

BACKGROUND OF THE INVENTION

1. Field of the Invention

The present invention relates to the reproduction of data stored on a storage medium, and more particularly, to a storage medium storing programs to provide additional functions using moving-images and management information needed to manage the programs, and a reproducing apparatus and method.

2. Description of the Related Art

Moving-image data recorded on a conventional recording medium contains moving-image information that is compression-encoded and navigation information that is needed to control the reproduction of the moving-image information.

Specifically, moving-image information includes an audio-visual stream comprising video, audio and/or subtitles, which are encoded according to a motion picture experts group (MPEG) standard. Moving-image information may further include additional information, such as encoding properties of a moving-image stream or an entry point for random access, and a play list created by arranging the order of reproducing moving-images.

Navigation information includes navigation commands controlling the reproduction of the moving-image information. Examples of the navigation commands include a command to reproduce a play list and a command to jump to another play list.

Moving-image information can be reproduced with reference to the navigation information stored in a storage medium, and a user can watch a high-quality moving-image such as a movie.

There is a need for applications that have programming functions in addition to a basic data-reproducing function to facilitate interactions with users. However, programs providing interactive functions, such as games or chatting services, cannot be recorded on the conventional storage medium together with the moving-image information.

SUMMARY OF THE INVENTION

Aspects of the present invention provide a storage medium storing program applications providing additional functions using moving-images and management information needed to manage the program applications, and a reproducing apparatus and method.

According to an aspect of the present invention, there is provided a storage medium storing reproduction mode data reproducing moving-image data; program data including a plurality of program applications providing additional functions using the moving-image data; system data controlling the execution of the reproduction mode data and the program data; and management information for managing the execution of the program applications in units of titles.

According to an aspect of the present invention, the management information includes information regarding program applications corresponding to a title. The reproduction mode data includes moving-image information that is compression-encoded and navigation information that is needed to control the reproduction of the moving-image information.

According to an aspect of the present invention, the management information includes at least one of information regarding a program application to be first executed or position information of the program applications corresponding to the title. The management information includes at least one of start time information, termination time information, start method information and termination method information of the program applications, information regarding amounts of memory that must be allotted to the program applications, execution start parameter information including initial information required to execute the program applications or a method of obtaining the initial information.

According to an aspect of the present invention, the management information includes information regarding the title and at least one of basic information, attribute information, operation information, and additional information of the program applications corresponding to the title. The information regarding the title includes a title number and a title name.

According to an aspect of the present invention, the basic information includes at least one of storage locations of the program applications, names of the program applications, information regarding the title to which the program applications correspond, and entry point information indicating the program application to be first executed.

According to an aspect of the present invention, the attribute information includes at least one of version information of the program applications, title-bound execution limitation information indicating whether the program applications operate within a reproduction scope of the title or operate regardless of the reproduction scope of the title, and application execution limitation information indicating whether the program applications operate only when the storage medium, in which the program applications are first executed, is inserted into a reproducing apparatus or the program applications continue to operate even after the storage medium is removed from the reproducing apparatus and a new storage medium is inserted into the reproducing apparatus.

According to an aspect of the present invention, the operation information includes at least one of execution method information, execution start time information, termination method information, termination time information, information regarding memory required, the execution start parameter information including the initial information required to execute the program applications or the method of obtaining the initial information, pause time information, preload information, of pre-patch information.

According to an aspect of the present invention, the preload information indicates whether the program applications will be buffered from the storage medium in advance. The pre-patch information is information regarding times when the program applications are loaded from a preload buffer to a system memory in advance.

According to an aspect of the present invention, the start time information, the termination time information, the pause time information, and the pre-patch information have, as an attribute value, reproduction path identifier information of moving-image data included in the reproduction mode data and/or time values assigned to the reproduction paths.

According to an aspect of the present invention, the reproduction path identifier information includes an identifier of a play item, which is a sub-reproduction unit included in a play list, which is a reproduction unit of the moving-image data. The additional information includes version information of the management information.

According to an aspect of the present invention, the program data includes title-unbound program applications corresponding to a plurality of titles, and the management information includes information regarding the titles to which the program applications correspond.

Each of the titles includes a main program application, and the main program application includes control information needed to control a plurality of sub-program applications corresponding to the same title.

According to an aspect of the present invention, the control information includes commands or events for executing the sub-program applications and commands or event for terminating the sub-program applications. The control information includes execution commands for the title-unbound program applications corresponding to a plurality of titles and execution commands for title-bound program applications corresponding to a title.

According to an aspect of the present invention, the program data is any one of a Java program application or a hypertext markup language program application.

According to an aspect of the present invention, the program data includes programs providing at least one of a game function using a moving-image, a function for displaying a director's commentary while reproducing a portion of the moving-image, a function displaying information related to the moving-image while reproducing a portion of the moving-image, or a chatting function while reproducing the moving-image.

According to another aspect of the present invention, there is provided a reproducing apparatus including a reader reading management information from a storage medium storing reproduction mode data reproducing moving-image data, program data including a plurality of program applications providing additional functions using the moving-image data, system data controlling the execution of the reproduction mode data and the program data, and the management information managing the execution of the program applications in unit of title; and a reproducer controlling the execution of the program applications in unit of title based on the management information read by the reader.

According to another aspect of the present invention, there is provided a reproducing method including reading management information from a storage medium storing reproduction mode data reproducing moving-image data, program data including a plurality of program applications providing additional functions using the moving-image data, system data controlling the execution of the reproduction mode data and the program data, and the management information managing the execution of the program applications in unit of title; and controlling the execution of the program applications in unit of title based on the management information read by the reader.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a table of Java program management information according to an embodiment of the present invention;

FIG. 10 is a table of Java program management information created based on the configurations of the program management information and the application management information illustrated in FIGS. 8 and 9 according to an embodiment of the present invention;

FIG. 11 is a table of Java program management information according to another embodiment of the present invention;

DETAILED DESCRIPTION OF THE EMBODIMENTS

Figure 1:
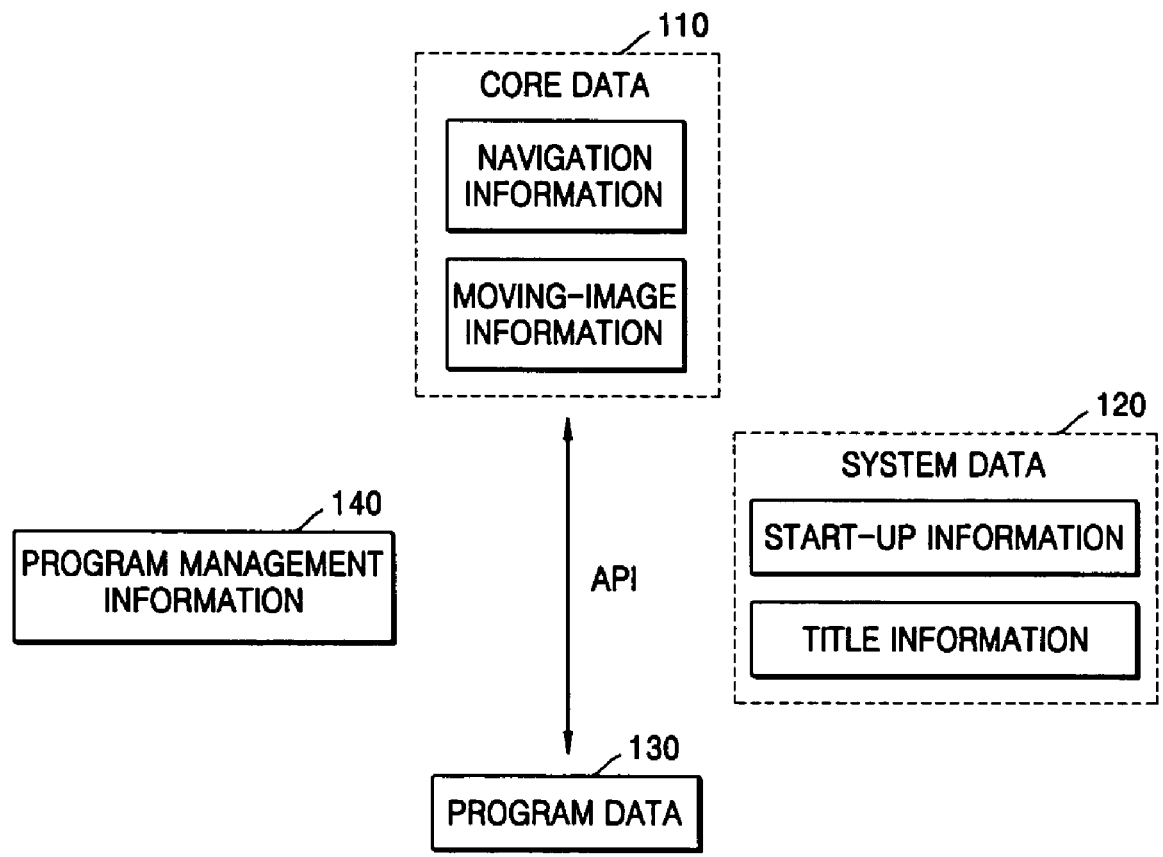
FIG. 1 illustrates types of data recorded on a storage medium according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates types of data recorded on a storage medium according to an embodiment of the present invention. Referring to FIG. 1, the storage medium has core data 110, system data 120, program data 130, and program management information 140 recorded thereon.

The core data 110 includes moving-image data and navigation data comprising commands that reproduce moving-image data. The core data 110 is called data for a core mode or a movie mode since the core data 110 is referred to when a video application such as a movie on a DVD is reproduced in this mode. The storage medium may further store the program data 130 having programming functions facilitating interactions with a user. In this case, the core data 110 and the program data 130 on the storage medium are called full data or data for a full mode.

The system data 120 is the first data read when a reproducing apparatus is initialized and includes start-up information and title information. The start-up information indicates the position of an object to be first reproduced by the reproducing apparatus. The title information includes entry point information indicating the position of each object to be reproduced.

The program data 130 may include at least one object that provides additional functions other than reproducing a moving-image, for example, an interactive function, a game function using moving-images, a function displaying a director's commentary while reproducing a portion of a moving-image, a function displaying additional information while reproducing a portion of a moving-image, or a chatting function while reproducing a moving-image. To execute a program while reproducing a moving-image, the program data 130 may include an application program interface (API) function for a presentation engine that reproduces moving-image information.

The program management information 140 is needed by a program application to effectively manage the reproduction of the program data 130 if additional functions are provided while reproducing moving-image data recorded on the storage medium. The program management information 140 will be described in detail later.

The storage medium may be easily detachable from a reproducing apparatus and may be an optical disk that can be read by an optical device of the reproducing apparatus. For example, the storage medium may be a CD-ROM, a DVD, or an optical disk that will be developed in the future.

Figure 2:
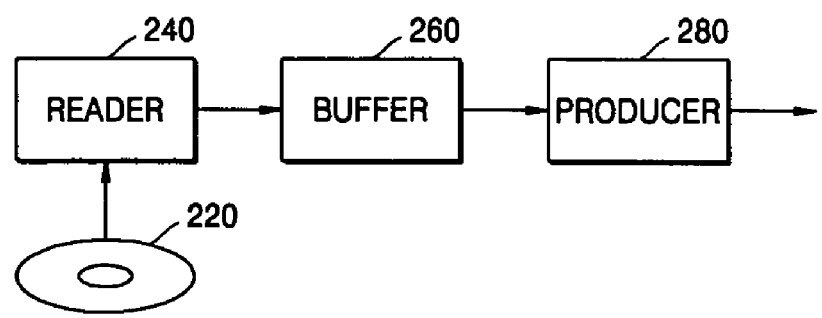
FIG. 2 is a block diagram of a reproducing apparatus reproducing data stored on the storage medium according to an embodiment of the present invention.

FIG. 2 is a block diagram of a reproducing apparatus reproducing data stored in a storage medium 220 according to an embodiment of the present invention. Referring to FIG. 2, the reproducing apparatus includes a reader 240, a buffer 260, and a reproducer 280.

The reader 240 reads data from the storage medium 220. If the storage medium 220 is an optical disk, the reproducing apparatus includes an optical device that can read data from an optical disk.

The buffer 260 temporarily stores the data read by the reader 240. The reproducer 280 reproduces the data based on the system data 120 and the program management information 140 stored in the buffer 260. The reproduced data is displayed on a display device (not shown).

Figure 3:
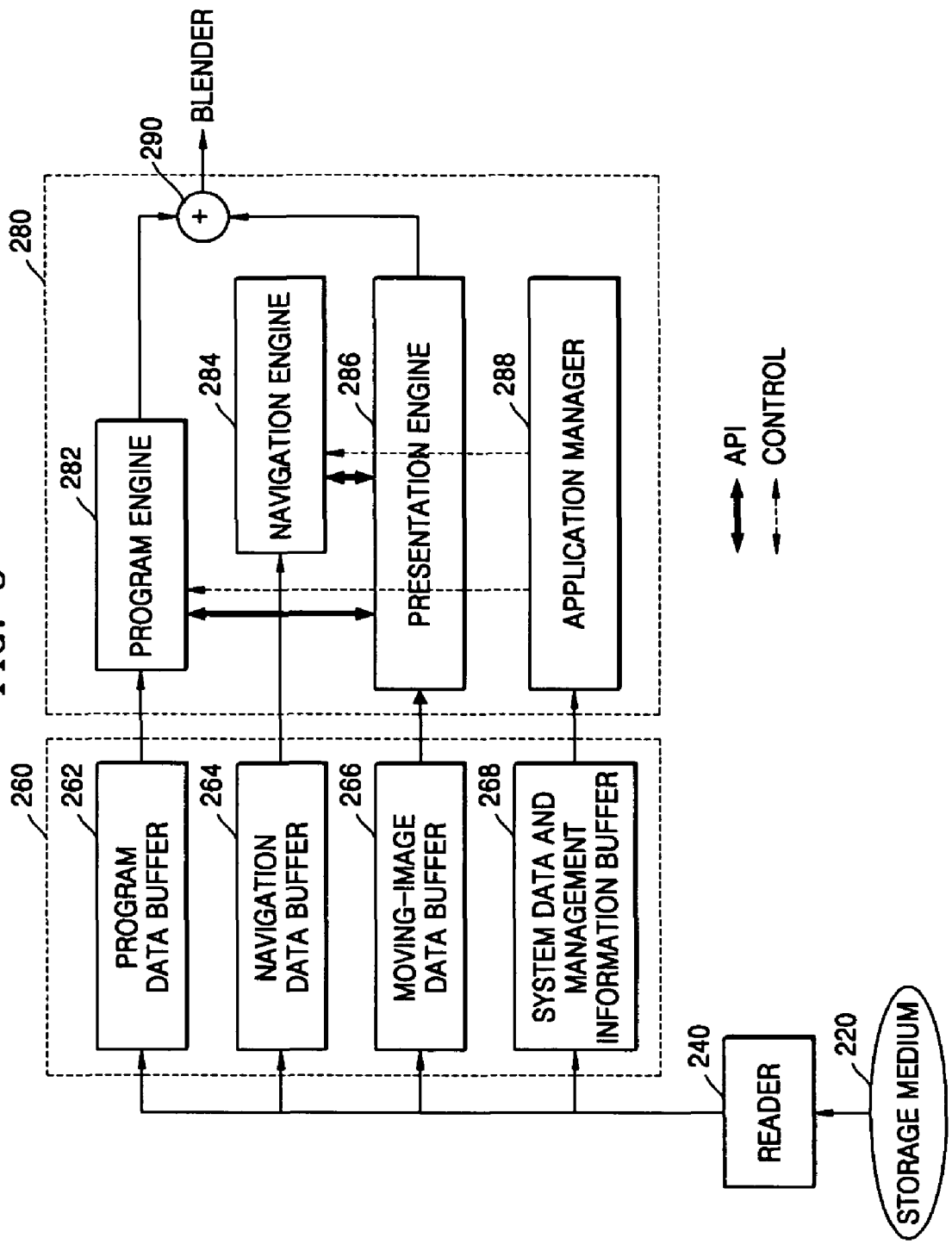
FIG. 3 is a detailed block diagram of the buffer and the reproducer illustrated in FIG. 2.

FIG. 3 is a detailed block diagram of the buffer 260 and the reproducer 280 illustrated in FIG. 2. Referring to FIG. 3, the buffer 260 temporarily stores data read by the reader 240 in program data buffer 262, a navigation data buffer 264, a moving-image data buffer 266, and a system data & management information buffer 268 according to the type of data read.

The reproducer 280 includes reproducing engines having respective reproducing functions that are used according to the types of data reproduced. Specifically, the reproducer 280 includes a program engine 282, a navigation engine 284, and a presentation engine 286. The reproducer 280 also includes an application manager 288, and a blender 290.

The program engine 282 receives the program data 130 from the program data buffer 262 and reproduces the program data 130. In other words, the program engine 282 executes a game, chatting, or director's commentary program. Therefore, it is possible to strengthen interactivity using moving-images. The program engine 282 controls the presentation engine 286, which reproduces moving-images, using the API function.

The navigation engine 284 receives the navigation data of the core data 110 from the navigation data buffer 264 and controls the reproduction of moving-image data according to the navigation data. Like the program engine 282, the navigation engine 284 controls the presentation engine 286, which reproduces moving-images, using the API function to reproduce the moving-images.

The presentation engine 286 receives at least one of a moving-image stream, a still-image, or a data file from the moving-image data buffer 266, and decodes and reproduces the moving-image stream, the still-image, or the data file.

The application manager 288 receives the system data 120 and the program management information 140 from the system data & management information buffer 268 and controls the execution of the program data 130 needed for the navigation engine 284 and the presentation engine 286 to reproduce the moving-image information and for the program engine 282 to provide additional functions.

In other words, the application manager 288 controls the navigation engine 284 such that the presentation engine 286 can reproduce the moving-image data and the program engine 282 to provide the additional functions. The application manager 288 determines the data that is to be first reproduced based on an entry point of the start-up information of the system data 120. While data is being reproduced, the application manager 288 retrieves titles based on the system data 120 and transmits entry points of the titles to the respective reproducing engines.

If the full mode is selected, the application manager 288 manages a plurality of applications in units of titles with reference to the program management information 140 stored in the system data & management information buffer 268 before each of the titles is executed. The application manager 288 controls the program engine 282 to load a specific application to be executed into a system memory before executing the applications.

The application manager 288 may include a user input receiver and processor (not shown) processing a user input and transmitting the user input to a corresponding reproducing engine.

The blender 290 overlays graphics reproduced by the program engine 282 using the API function for the presentation engine 286 or moving-images reproduced by the presentation engine 286 into one image and outputs the image. Hence, while a moving-image is being reproduced, additional functions can be provided using the program data 130.

Figure 4:
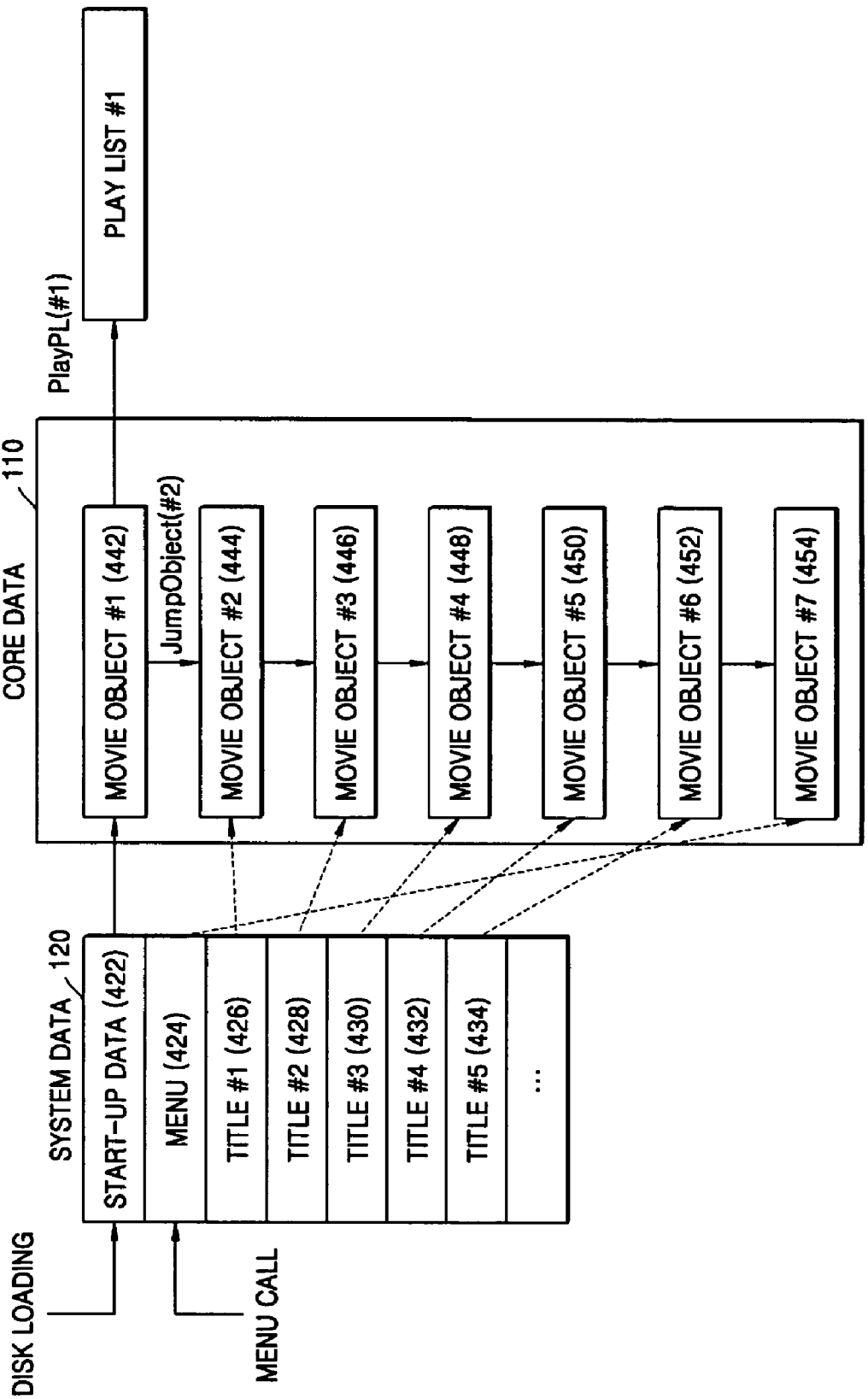
FIG. 4 illustrates a method of navigating core data using system data according to an embodiment of the present invention.

FIG. 4 illustrates a method of navigating the core data 110 using the system data 120 according to an embodiment of the present invention. Referring to FIG. 4, the system data 120 includes start-up data 422, a menu 424, and title information (i.e., title #1 426, title #2 428, title #3 430, title #4 432, title #5 434, etc).

The start-up data 422 indicates a starting position of a title to be first reproduced when data stored on the storage medium 220 is reproduced by the reproducing apparatus. The menu 424 is displayed on a screen so that a user can access a title through the menu.

A title is a logical unit for a user to access a particular scene and the title information includes entry point information indicating a reproduction-start position of a movie object. In other words, the title information is link information enabling a user to access a particular scene. For example, the title #1 426 includes entry point information indicating the reproduction-start position of movie object #2 444.

The method of navigating the core data 110 will now be described with reference to FIGS. 3 and 4. Referring to FIG. 3, when the reproducing apparatus is initialized, the system data 120 is read by the reader 240. The read system data 120 is temporarily stored in the system data & management information buffer 268 and transmitted to the application manager 288. The application manager 288 refers to the start-up data 422, the menu 424, and entry points of the title information included in the system data 120.

The application manager 288 transmits one of the entry points included in the system data 120, e.g., the entry point of a movie object 442 to be first reproduced, to the navigation engine 284. The navigation engine 284 transmits a navigation command included in the movie object 442, for example, PlayPL (#1), to the presentation engine 286.

The presentation engine 286 reproduces a moving-image in the core mode using the navigation command PlayPL (#1) received from the navigation engine 284 and corresponding moving-image data received from the moving-image data buffer 266.

In an embodiment of the present invention, the reproducing apparatus reproduces the moving-image data based on navigation commands included in the movie object that is first reproduced. Then, a next movie object is reproduced in response to the last navigation command of the current movie object. For example, referring to FIG. 4, the reproducing apparatus reproduces the moving-image data based on the movie object #2 444 corresponding to the title #1 426 in response to JumpObject #2, which is the last navigation command of the movie object #1 442 that was first reproduced.

If a user does not change a title, the movie objects #1 442 through #7 454 are sequentially reproduced as indicated by the solid arrows in FIG. 4. After the last movie object #7 454 has been reproduced, the reproduction of the moving-image data may be stopped or frozen on the last scene according to the last navigation command of the movie object #7 454 set by a contents producer.

In the core mode for reproducing moving-images, a title points to a movie object that is to be executed. In the core mode, even if a title points to a plurality of movie objects, the movie objects can be sequentially reproduced, but two or more movie objects cannot be reproduced simultaneously. Therefore, it is possible to clearly define the reproduction scope of the moving-image data as the time during which a movie object is reproduced or multiple movie objects are sequentially reproduced.

Referring to FIG. 4, the title information included in the system data 120 allows a user to access a particular scene, that is, allows a user random access. The title information may include entry point information indicating the reproduction-start position of a movie object corresponding to a title and information regarding whether a user accesses a title. Accordingly, it is possible to retrieve a particular scene and start to reproduce the moving-image data from the retrieved scene.

Figure 5:
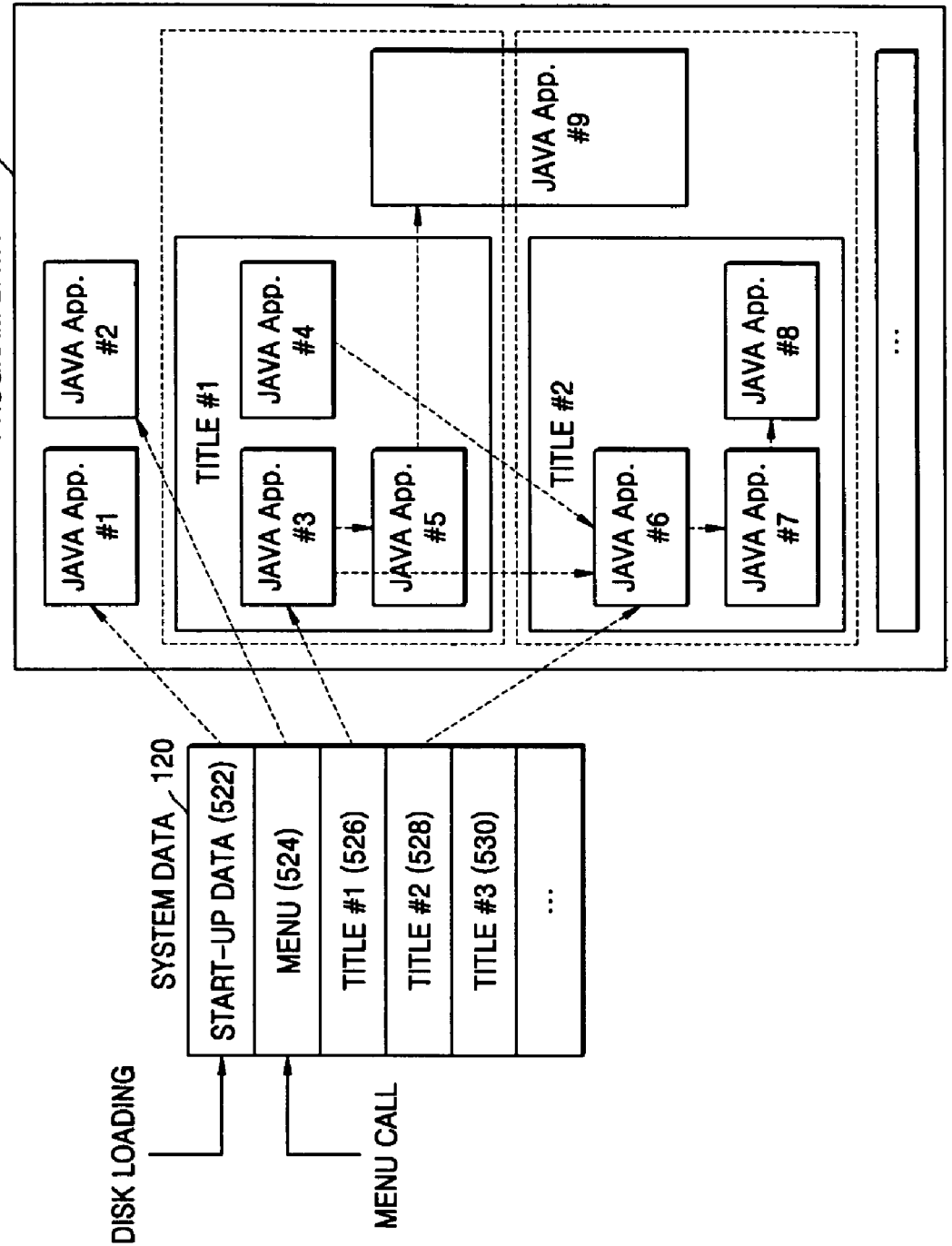
FIG. 5 illustrates a method of navigating full mode data according to an embodiment of the present invention.

FIG. 5 illustrates a method of navigating Java applications in a full mode to provide additional functions using the system data 120 according to an embodiment of the present invention. The method of navigating the Java applications in the full mode will now be described with reference to FIGS. 3 and 5.

Referring to FIG. 3, like the core mode illustrated in FIG. 4, when the reproducing apparatus is initialized, the system data 120 is read by the reader 240. The read system data 120 is temporarily stored in the system data & management information buffer 268 and transmitted to the application manager 288. The application manager 288 refers to the start-up data 522, the menu data 524, and entry points of the title information included in the system data 120.

The application manager 288 transmits one of the entry points included in the system data 120, e.g., the entry point of a Java application to be first reproduced, to a Java engine, i.e., the program engine 282 illustrated in FIG. 3. The Java engine executes a corresponding Java application.

Referring to FIG. 5, there may be a plurality of Java applications corresponding to a title since the Java applications can operate simultaneously. The Java applications (i.e., JAVA App. #1, JAVA App. #2, JAVA App. #3, JAVA App. #4, etc.) respectively include commands provided by Java programs. The commands are executed in the order that they are recorded, but a command can be executed while another command is being executed.

In addition, even after all predetermined commands have been executed, the Java applications are not terminated because termination commands (for example, ex, exit ( )) must be executed for the Java applications to be terminated. Hence, as long as the termination commands are not executed, the Java applications corresponding to the title continue to execute programs during their respective life cycles.

Therefore, the Java applications may continue running regardless of the reproduction scope (i.e., the period when the title is reproduced). Thus, the execution scope (i.e., the period when a Java application can run) of the Java applications corresponding to the title is unclear. It is also not clear whether the Java applications being executed will be continued or not if the title is changed before the termination commands are executed.

Therefore, in aspects of the present invention, the program management information 140, for example, Java program management information is used to control the additional functions. The Java program management information used in aspects of the present invention is independent of other data illustrated in FIG. 1. The Java program management information may be in a binary or text form.

Figure 6:
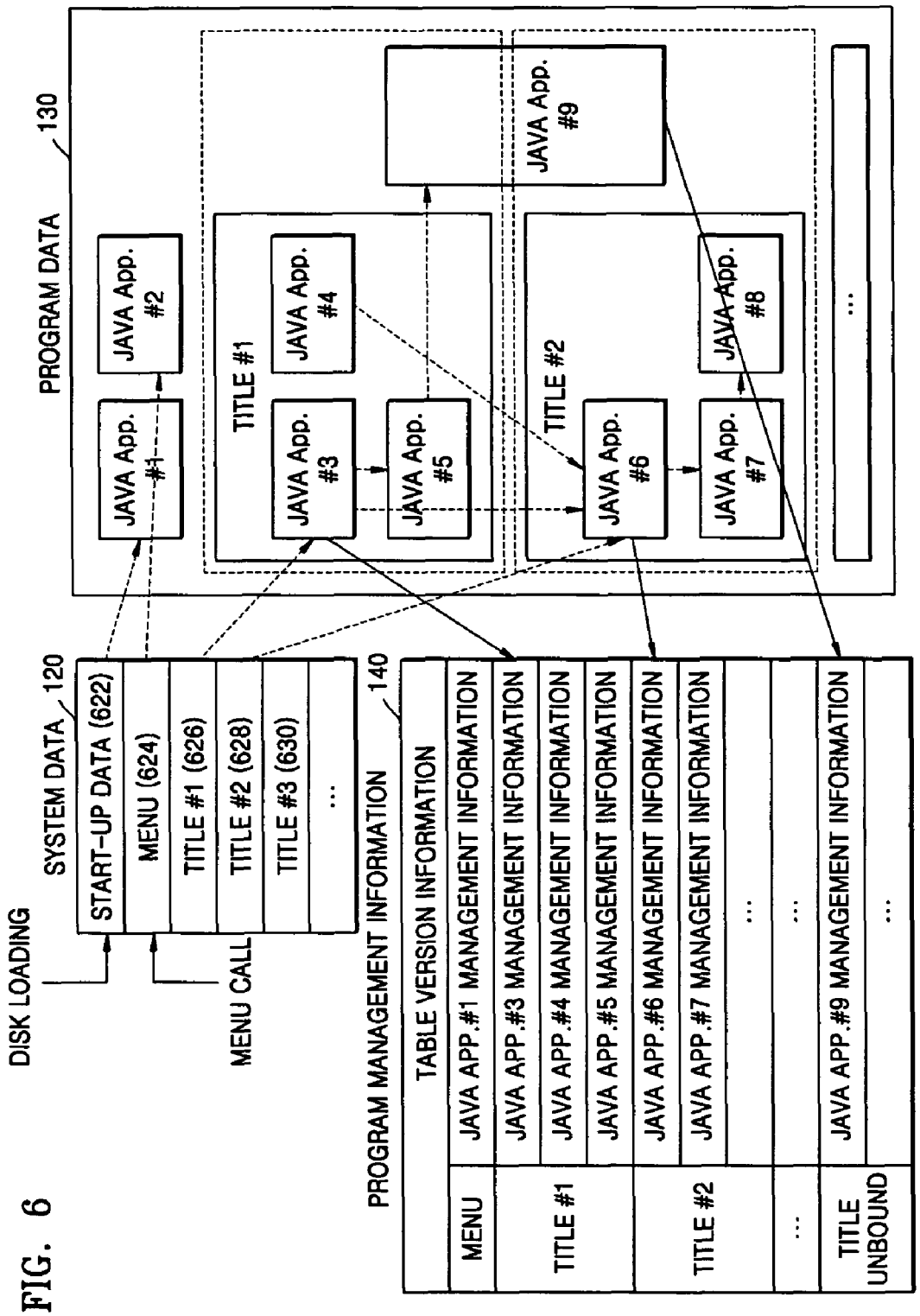
FIG. 6 illustrates a method of navigating the full mode data using program management information according to an embodiment of the present invention.

FIG. 6 illustrates a method of navigating full mode data using the program management information 140 according to an embodiment of the present invention. Referring to FIG. 6, the application manager 288 reads management information regarding, for example, title #1 626 and the JAVA App. #3 corresponding to the title #1 626 and executes the Java App. #3 based on the read management information JAVA App. #3 management information.

Therefore, despite the fact that Java applications operate regardless of the reproduction scope of a title as described above, the execution scope of Java applications corresponding to a title is clear. Moreover, even if the title is changed, the execution of the Java applications corresponding to the title can be controlled based on the management information.

Specific examples of the program management information 140 according to an embodiment of the present invention will now be described. FIG. 7 is a table of the program management information 140 (hereinafter called Java program management information) according to an embodiment of the present invention. Referring to FIG. 7, management information regarding Java applications corresponding to titles is provided.

As described above, Java applications corresponding to a title can be executed regardless of an execution order. While two or more applications can be reproduced simultaneously, it is impossible to predict when the execution of the Java applications will end.

Therefore, the Java program management information includes the following information needed to check a particular time or situation, for example, the state of a Java application corresponding to a title.

1) Title Information 710: A title is a logical unit that a user can recognize. A user can randomly access information stored in the storage medium using the title information 710. An example of the title information 710 is a menu 702 provided to a user.

2) Java application information 720: A plurality of Java applications may be related to a title. The Java application information 720 includes information regarding Java applications that correspond to a title. For example, the Java application information 720 related to the title #1 526 of FIG. 5 includes information regarding the Java applications JAVA App #3, the JAVA App #4, JAVA App #5, and JAVA App #9.

3) Operation and state information 730: The operation and state information 730 includes the operation and state information of the Java applications. Specifically, the operation and state information 730 includes information regarding when and how the Java applications corresponding to a title start and end. The operation and state information 730 may include information regarding a Java application to be first executed when a title is selected by a user or by a navigation command and information regarding the amount of memory required by the Java application.

A title may comprise a main Java application, and sub-Java applications that can be reproduced together with the main Java application and are executed by a program included in the main Java application. For example, in FIG. 6, JAVA App. #3 is the main Java application, and the JAVA App. #4 and the JAVA App. #5 are the sub-Java applications of the JAVA App. #3. Therefore, the JAVA App. #4 and JAVA App. #5 are executed by a program within the JAVA App. #3.

Alternatively, the sub-Java applications may be terminated by a program command or a particular event included in the main Java application or terminated when the main Java application is terminated.

There are two types of Java applications; title-bound Java applications (e.g., Java applications #3, #4, #6, and #7) and title-unbound Java applications (e.g., Java application #9). The operation of the title-bound Java application is bounded by a title. The execution scope of the title-bound Java application corresponding to a title is the same as or within the reproduction scope of the title. If the title is changed, the title-bound Java application is terminated. For example, when a Java application corresponding to a title calls another title, thereby changing the title, the title-bound Java application is terminated immediately. Referring to FIG. 6, the JAVA App. #3, the JAVA App. #4, and the JAVA App. #5 are the title-bound Java applications, and their life cycles are within the reproduction scope of the title #1 626.

The operation of the title-unbound Java applications corresponding to a title is not bounded by the reproduction scope of the title. The execution scope of the title-unbound Java applications corresponding to a title may overlap the reproduction scopes of titles or be the same as the reproduction scope of an entire disk. In other words, the title-unbound applications may continue running even after the reproduction of the title is terminated and the reproduction of another title has started. Therefore, if the title is changed, the title-unbound Java applications do not necessarily terminate.

Referring to FIG. 6, the JAVA App. #9 is a title-unbound Java application. The life cycle of the JAVA App. #9 is not the same as the reproduction scope of the title #1 626. Thus, even if the reproduction of the title #1 626 is terminated, the JAVA App. #9 is not terminated, and the execution scope of the Java App. #9 is between the title #1 626 and title #2 628.

Therefore, the title information 710 may further include information indicating whether each application is a title-bound application or a title-unbound application. It is also possible to bundle title-unbound applications in a disk into a unit and manage the unit.

If a title links to a main Java application, it is possible to divide commands used by the main Java application to execute sub-Java applications into commands for title-bound Java applications and title-unbound Java applications, and the title information 710 may also include this information. Examples of such commands are as follows.

1) If executing a title-bound application: exec ("JAVA application name", bound)

2) If executing a title-unbound application: exec ("JAVA application name", unbound)

A menu 702 can also be classified in the same way as the titles, as illustrated in FIG. 7. When the program mode providing additional functions is selected before each Java application is executed, the Java program management information is referred to in order to manage a plurality of Java applications in units of titles in order to smoothly manage a memory when a plurality of applications execute. If applications corresponding to a title are determined, the amount of memory required by each application linked to a unit of a title can be identified.

The start and end times of applications corresponding to a title are respectively set according to the respective properties of the applications. This enables resources to be efficiently managed. For example, there may be an application that does not operate simultaneously with any other applications. Since such an application can use the same memory space in different time, it is possible to reduce the amount of memory required.

An example of using Java applications has been described above, but the same method can be applied to a markup language application such as a hypertext markup language (HTML) application or other applications.

The program management information 140 according to another embodiment of the present invention will now be described. In this embodiment, the program management information 140 includes management information needed to manage the states and operations of applications.

A management information table includes title information, basic information, attribute information, operation information, and additional information of an application. Accordingly, the reproducing apparatus operates in the full mode using information provided by the management information table. Information included in the management information table will now be described.

Figure 8:
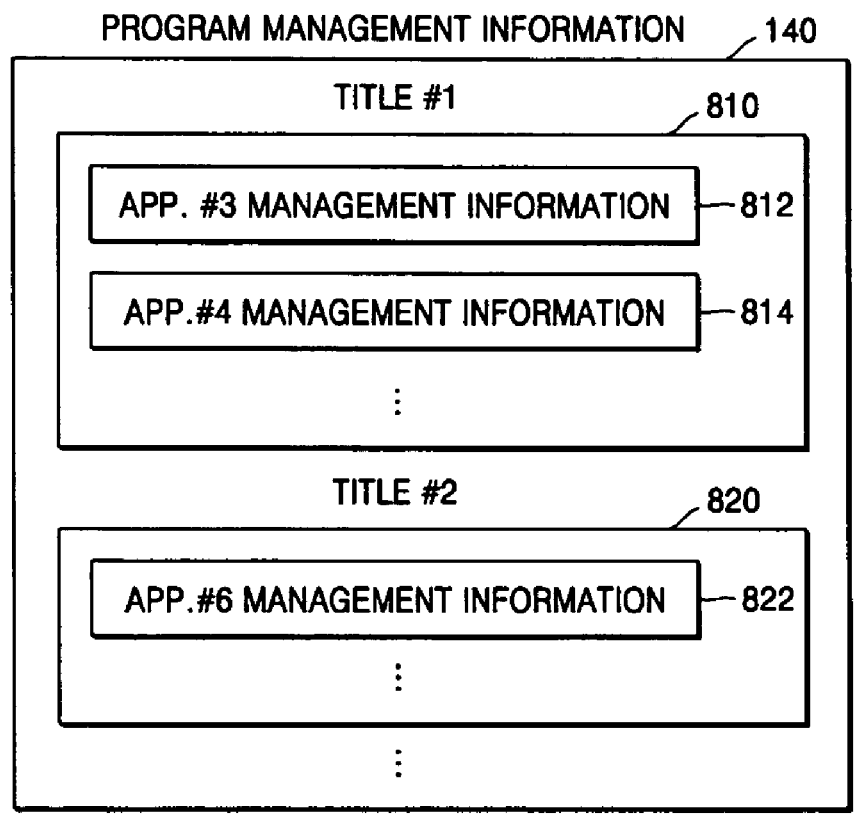
FIG. 8 illustrates a configuration of the program management information according to another embodiment of the present invention.

FIG. 8 illustrates a configuration of the program management information 140 according to another embodiment of the present invention. Referring to FIG. 8, the program management information 140 includes information regarding at least one title, and each title includes application management information of a plurality of applications corresponding to each title. For example, information regarding title #1 810 includes corresponding application management information regarding application #3 812 and application #4 814. Similarly, information regarding title #2 820 includes corresponding application management information regarding application #6 822.

Figure 9:
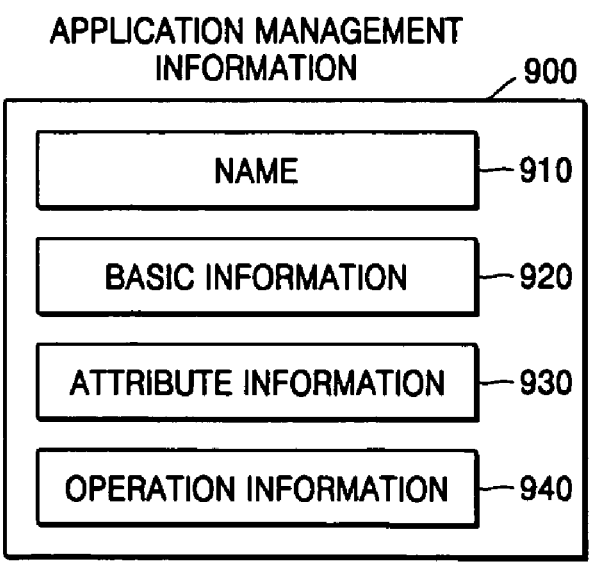
FIG. 9 illustrates a configuration of application management information according to an embodiment of the present invention.

FIG. 9 illustrates a configuration of application management information 900 according to an embodiment of the present invention. Referring to FIG. 9, the application management information 900 includes a name 910, basic information 920, attribute information 930, and operation information 940.

FIG. 10 is a table of the Java program management information created based on the configurations of the program management information 140 and the application management information 900 illustrated in FIGS. 8 and 9 according to an embodiment of the present invention. Referring to FIG. 10, the Java program management information includes title information 1010, basic application information 1020, application attribute information 1030, and application operation information 1040.

As in the core data 110, a title is a logical unit that a user can recognize. A user can randomly access information stored in the storage medium based on the title information 1010. An example of the title information 1010 is a menu provided to a user. The title information 1010 indicates a title number and a title name (e.g., Title #1, Title Name 1060) stored on the storage medium. Title numbers are identifiers distinguishing a plurality of titles stored on the storage medium. Title names are also identifiers for distinguishing the titles and may summarize the contents of the titles.

The basic application information 1020 includes storage locations of applications corresponding to a title, application names, information regarding the title, and entry point information. The storage locations of applications indicate positions and file names of the applications stored in the storage medium. Application names distinguish applications from other applications and can be provided to a user or to other applications.

The title information 1010 is information regarding titles under which corresponding applications operate and includes title numbers. The entry point information in the basic information 1020 indicates an application to be first executed in a title when the title is reproduced by a user's choice or a command such as a navigation command.

The application attribute information 1030 includes application version information, title-bound execution limitation information, and application execution limitation information. The application version information indicates versions of applications and can be used when upgrading applications to newer versions. Specifically, if an application on the Internet has the same name as an application stored in the storage medium, the application version information is used to compare the two applications. If the application online is a newer version than the application stored on the storage medium, the application online is downloaded to upgrade the application stored on the storage medium.

The title-bound execution limitation information indicates whether an application corresponding to a title operates only within the reproduction scope of the title or operates regardless of title changes. The title-bound execution limitation information includes information regarding whether an application can continue to operate even after the storage medium is changed to another storage medium in the same series.

In other words, the title-bound execution limitation information includes the application execution limitation information indicating whether an application operates only when the storage medium being reproduced when the application was first executed is in the reproducing apparatus or the application continues to operate even after the storage medium is removed from the reproducing apparatus and a new storage medium is inserted into the reproducing apparatus.

The application execution limitation information may further include information regarding the expiration dates of applications or hardware version information that can guarantee the operation of the applications.

The application operation information 1040 includes an execution method, execution start time information, a termination method, termination time information, required memory information and/or execution start parameter information. The execution method is a method or an event of starting the execution of an application. The execution start time information indicates the time when an application is started based on time information such as media time. For example, if the execution start time information is zero, immediately after a title is selected, an application corresponding to the title starts.

The termination method is a method or an event of terminating the execution of an application. If an application is terminated based on time information such as media time, the time information is the termination time information.

The required memory information indicates the amount of memory required for applications to operate. The execution start parameter information is external information required for applications to be executed and may include state information of running applications, state information of a player, or predetermined data. The execution start parameter information may be memory or register information.

The additional information 1002 includes version information of the management information table. It is possible to compare the version information of the management information table with that of a management information table on the Internet and, if the management information table on the Internet is a newer version, upgrade the management information table stored on the storage medium to the management information table on the Internet. It is understood that the various program management information 140 described in the table illustrated in FIG. 10 may be arranged in many different configurations. The program management information 140 may be comprised of only one or any combination of the described management information 140 parameters.

FIG. 11 is a table of the Java program management information according to another embodiment of the present invention. Referring to FIG. 11, the Java program management information 140 includes title information 1110, basic application information 1120, application attribute information 1130, and application operation information 1140. The same description made with reference to FIG. 10 applies to the title information 1110, the application basic information 1120, the application attribute information 1130, and the application operation information 1140 illustrated in FIG. 11. However, the application operation information 1140 includes execution start time information and termination time information that are different from those of the application operation information 1040 illustrated in FIG. 10. The application operation information 1140 further includes pre-load information, pre-patch information, and pause time information.

According to the execution start time information illustrated in FIG. 10, the time when an application is executed is generally determined based on time information of moving-image data for reproduction. Therefore, the attribute value of the execution start time information is a time value. However, the execution start time information illustrated in FIG. 11 can be used for reproducing an application providing various interactive functions as well as reproducing moving-image data. As discussed above with respect to FIG. 10, it is understood that the various program management information 140 parameters described in the table illustrated in FIG. 11 may be arranged in many different configurations. The program management information 140 may be comprised of only one or any combination of the described management information 140 parameters.

For example, moving-image data may have a plurality of reproduction paths to reproduce multiple stories. If only time values are included in the execution start time information and termination time information of an application, the reproduction paths can have different time values. Thus, the application can be executed at a time undesired by its producer.

In this regard, in the present embodiment, the execution start time information and termination time information further include information for distinguishing multiple paths in addition to time values. For example, a Blu-ray Disc (BD-ROM) for reproducing high quality moving-images may include, as the execution start time information or the termination time information, an identifier of a play item, which is a basic unit of reproduction included in a play list specifying a reproduction order.

Accordingly, the reproducing apparatus can execute or terminate an application using an identifier of a play item and time values indicated by an attribute value by interpreting the execution start time information and the termination time information.

The preload information indicates whether application data corresponding to a title will be preloaded into a buffer before the title starts to be reproduced according to a user's selection or a predetermined reproduction order. In the case of a title whose moving-image data and application data are to be reproduced together, the moving-image data may be buffered from the storage medium in advance to ensure seamless reproduction.

However, if the application data is read from the storage medium, the buffering of the moving-image data is interrupted, thereby hindering the seamless reproduction of the moving-image data. Therefore, the application data to be reproduced together with the moving-image data must be read to a preload buffer before the reproduction of the moving-image data starts and is then reproduced. The preload information in the present embodiment indicates whether application data corresponding to a title will be preloaded.

The pre-patch information indicates the time when buffered applications corresponding to a title are read to the system memory after the title is started. In other words, the pre-patch information indicates that the buffered applications will soon be executed. The time information used here may include an identifier of a play item and time values such as the execution start time information that has been described above.

The pause time information indicates the time when an application is paused. An application pauses so that some of resources that the application is using can be returned to the system to allow another application to operate temporarily during the time. The pause time information may further include when and how the application restarts after a pause. Time values may be used in the pause time information in the same manner as those used in the execution start time information described above.

A method of reproducing application data together with moving-image data will now be described based on the program management information table described above.

Figure 12:
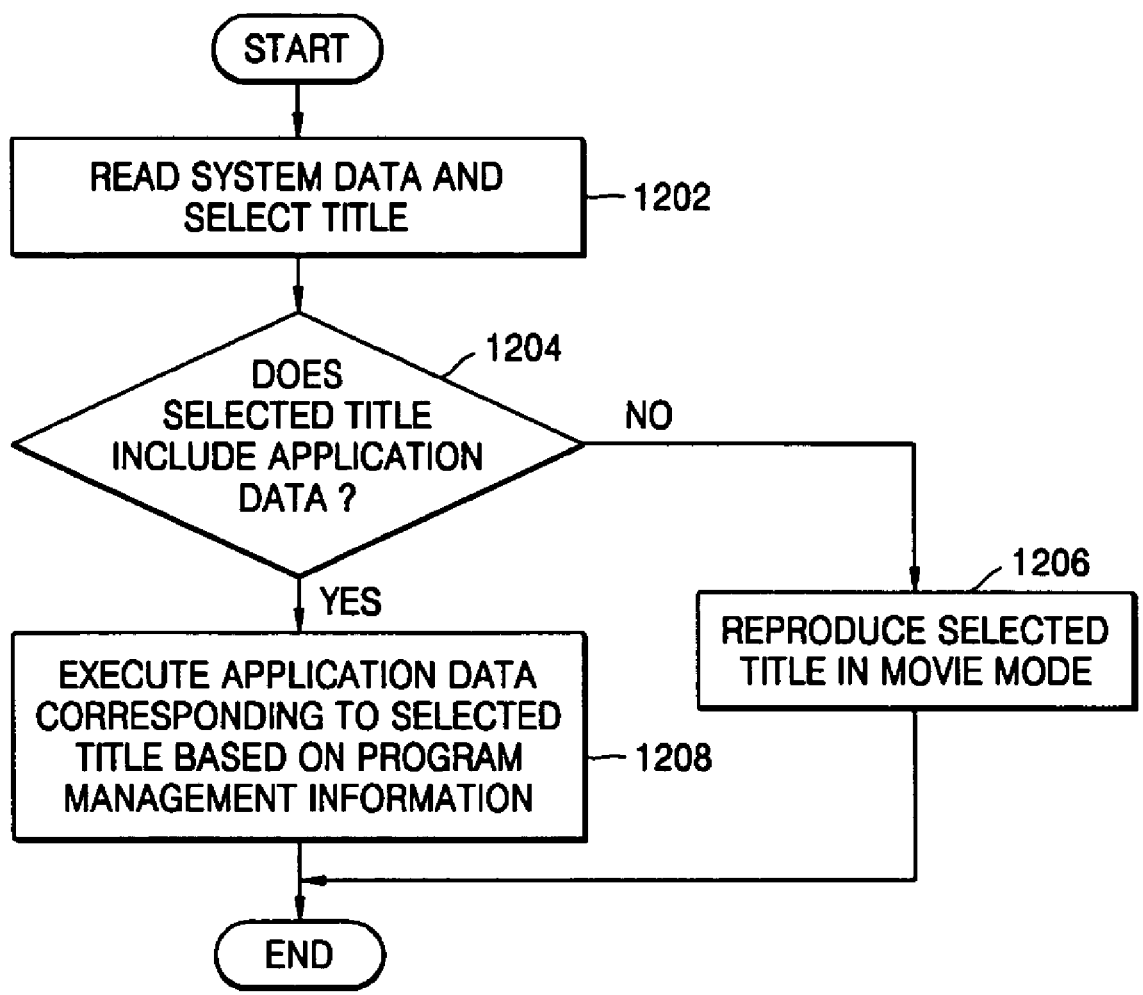
FIG. 12 is a flowchart illustrating a method of reproducing core mode or full mode data according to an embodiment of the present invention.

FIG. 12 is a flowchart illustrating a method of reproducing data stored in the storage medium according to an embodiment of the present invention. Referring to FIG. 12, the system data 120 is read and a title to be reproduced is selected in operation 1202. A user may select a title, or a title may be automatically selected according to the start-up information of the system data 120. It is determined whether the selected title indicates application data (i.e., full mode program data) or not in operation 1204.

If the selected title does not include the application data, the title is reproduced in the movie mode in operation 1206. If the selected title includes an application, then application data included in the selected title is executed based on the program management information 140. The application is executed/temporarily stopped/terminated using the program management information 140 regarding its position, start method, start time, termination method, termination time, pause time, and the amount of memory that must be allotted, title bound or unbound information, and preload information in operation 1208.

Figure 13:
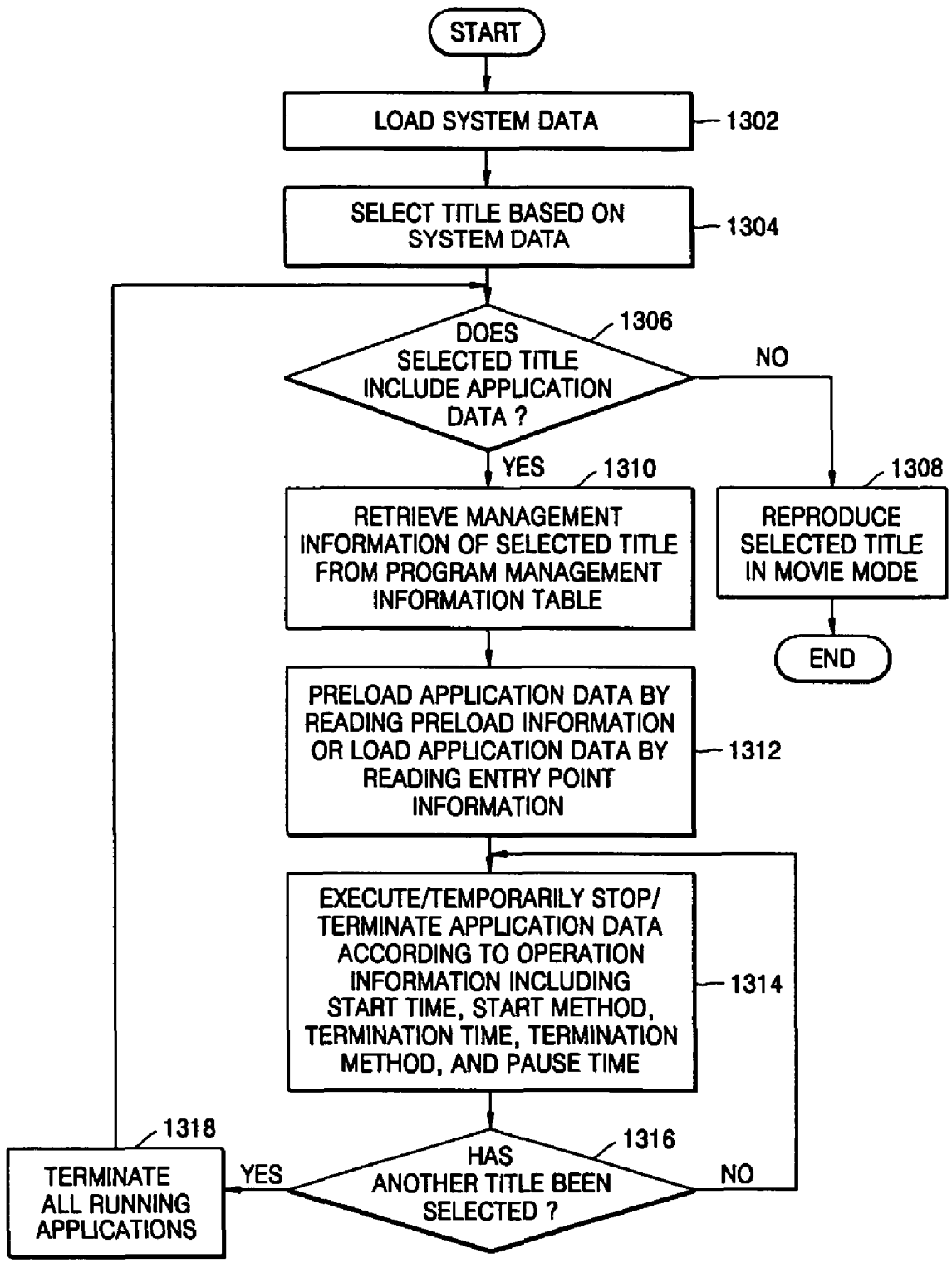
FIG. 13 is a flowchart illustrating the method illustrated in FIG. 12 in detail.

FIG. 13 is a flowchart illustrating the method illustrated in FIG. 12 in detail. Specifically, FIG. 13 illustrates a method of executing an application stored in the storage medium having the program management information 140.

First, the system data 120 is loaded from the storage medium to the reproducing apparatus in operation 1302. The system data 120 contains the title information and the execution start parameter information stored in the storage medium.

Then, a title is selected in operation 1304. The title may be selected through navigation command based on the execution start parameter information set by a producer or may be selected by a user.

Then, in operation 1306 it is determined whether the selected title includes application data providing a program function. If it is determined that the selected title does not include application data, the selected title includes only moving-image data. Therefore, the selected title is reproduced in the movie mode in operation 1308. On the other hand, if it is determined that the selected title includes application data, the recording and/or reproducing apparatus retrieves the program management information 140 corresponding to the selected title from the program management information table in operation 1310.

Then, the preload information is read from the retrieved program management information 140 that is temporarily stored in the system data and management information buffer 268 of the recording and/or reproducing apparatus. The preload information includes, as attributes, information regarding whether preloading is needed. If the preloading is required, the storage position and name of application data to be preloaded are obtained from the program management information table, and the application data is read into the preload buffer. If the preloading is not required, the entry point information is read from the program management information table, and the application data is loaded to the memory (operation 1312).

The application is then executed/temporarily stopped/terminated by the program engine 282 based on the operation information 1070 or 1170 such as execution start time, start method, termination time, termination method, and temporary storage time in operation 1314.

While the application is being executed, subsequent application data may be read from a buffer into the system memory in advance based on the pre-patch information. The subsequent application loaded into the system memory is executed by the program engine 282 at the start time or the time defined based on the start method information.

If another title is selected in operation 1316 while the application is being executed, all applications that are running are terminated in operation 1318, and operations 1306 through 1318 are re-performed.

As described above, the management information table specifies management information regarding applications in units of titles. The application manager 288 executes an application indicated by the system data 120 with reference to the management information table.

The contents of the management information table can be included in the system data 120. In this case, the application manager 288 can execute an application with reference to the management information included in the system data 120.

The program management information 140 can also be specified in units of applications instead of titles. A menu can also be classified in the same way as titles as illustrated in FIG. 7.

If the program mode providing additional functions is selected, the Java program management information 140 is referred to before each Java application is executed. Therefore, a plurality of Java applications can be managed in units of titles, and memory can be smoothly managed when executing a plurality of applications.

When the program mode providing additional functions is selected, the Java program management information 140 is referred to before each Java application is executed to manage a plurality of Java applications in units of titles and the Java applications are loaded in the system memory before being executed. Since applications corresponding to a title are predetermined, the amount of memory required by each application linked to in units of a title can be identified.

The start and end times of applications corresponding to a title are respectively set according to the respective properties of the applications. There may be an application that does not operate simultaneously with any other applications. Since such an application can use the same memory space in different time, it is possible to reduce the amount of memory required.

An example using Java applications has been described above, but the same method can be applied to a markup language application such as a hypertext markup language (HTML) application or other applications.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

As described above, when a storage medium according to the present invention is used, it is possible to manage a plurality of applications in unit of a title for providing additional functions while a moving-image is being reproduced. In addition, the memory can be smoothly managed when a plurality of applications are executed during reproduction of the moving-image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory storage medium for use with a recording and/or reproducing apparatus, the storage medium comprising:
   movie mode data comprising moving-image data and navigation commands for producing the moving-image data;
   a plurality of program applications configured to provide additional functions using the moving-image data;
   system data configured to control execution of the movie mode data and the program applications; and
   management information configured to manage execution of the program applications in units of titles,
   wherein the management information comprises information indicating whether a program application managed by the management information is a title-bound program application which is terminated when a title is changed or a title-unbound program application which continues running when the title is changed.

2. The storage medium of claim 1, wherein the management information comprises information regarding the program applications corresponding to one of the titles.

3. A reproducing apparatus, comprising:
   a reader configured to read management information from a storage medium configured to store: movie mode data comprising moving-image data and navigation commands for reproducing the moving-image data, a plurality of program applications configured to provide additional functions using the moving-image data, system data configured to control execution of the movie mode data and the program applications, and the management information configured to manage execution of the program applications in units of titles, the management information comprising information indicating whether a program application managed by the management information is a title-bound program application which is terminated when a title is changed or a title-unbound program application which continues running when the title is changed; and
   a reproducer configured to control the execution of the program applications in units of titles based on the management information read by the reader and determines whether to terminate a running program application or not based on the management information when title is changed.

4. The apparatus of claim 3, further comprising an application manager configured to control reproduction of the moving-image data and execution of the program applications based on the system data and the management information.

* * * * *